(12) United States Patent
Sheikh et al.

(10) Patent No.: US 7,350,405 B2
(45) Date of Patent: Apr. 1, 2008

(54) DISTURBANCE-RESISTANT BUMPLESS CRANKSHAFT POSITION SENSING (75) Inventors: Ahmed Esa Sheikh, Middletown, OH (US); Bo Nilson Almstedt, Amal (SE); Larry G. Anderson, Erie, PA (US); Kirk Heywood, Erie, PA (US); Ajith K. Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 11/398,424

(22) Filed: Apr. 5, 2006

(65) Prior Publication Data
US 2007/0256482 A1 Nov. 8, 2007

(51) Int. Cl.
*G01M 15/00* (2006.01)
(52) U.S. Cl. ...................................... 73/117.3
(58) Field of Classification Search .................. 73/116, 73/117.2, 117.3, 118.1
See application file for complete search history.

(56) References Cited

U.S. PATENT DOCUMENTS

| 5,471,869 | A | * | 12/1995 | Kuroda et al. | ............. | 73/117.3 |
| 5,670,713 | A | * | 9/1997 | Machida et al. | ............... | 73/116 |
| 6,041,647 | A | * | 3/2000 | Matsuoka | ...................... | 73/116 |
| 7,000,598 | B2 | * | 2/2006 | Sheikh et al. | ............... | 123/476 |
| 2005/0263138 | A1 | * | 12/2005 | Sheikh et al. | ............... | 123/476 |

* cited by examiner

*Primary Examiner*—Eric S. McCall
(74) *Attorney, Agent, or Firm*—Carlos L. Hanze; Timothy H. Van Dyke; Beusse Wolter Sanks Mora & Maire (57) ABSTRACT

Disclosed herein are methods of generating a virtual crankshaft positioning stream of signal pulses that is derived from one or more series of actual crank signals. The virtual stream is useful for monitoring crankshaft positioning and is able to persist despite electromagnetic disturbances in the series of actual crank signals.

30 Claims, 7 Drawing Sheets

DISTURBANCE-RESISTANT BUMPLESS CRANKSHAFT POSITION SENSING

BACKGROUND OF THE INVENTION

In engines with electronic control unit (ECU), the primary information upon which engine control calculations are based is the engine crankshaft position. An electronic control unit comprises processors, software, and electronic hardware to process signals and perform engine operations. In most cases, crankshaft positioning relies on the respective cylinder top dead center position (TDC) as a reference point. This angle information is used to precisely time key events related to engine combustion, which in turn affects engine performance and emission. The accuracy of this information is critical, as any error may lead to engine shutdown. There are generally two possibilities for signal failure: (1) failure of a sensor, wiring, or connector resulting in a loss of signal, or (2) a high level of external noise on the sensor signal lines that interferes with the signal's zero crossing detection.

In order to identify the cylinders of a multicylinder internal combustion engine, most ECUs require signals from a camshaft sensor and a crankshaft sensor. Most engines are configured such that the crankshaft undergoes two revolutions for every single revolution of the camshaft. Typically, the engine crankshaft comprises a crank wheel that is mechanically coupled to the crankshaft. The crank wheel comprises a plurality of elements with at least one reference element, such as a missing gap, oversized element, an attached element or differently configured or shaped element, and the like. Crank sensors are positioned proximate to the crank wheel to produce signals upon passage of the elements. This signal information is sent to the ECU, and the ECU determines the position of the crankshaft by counting the number of elements after the marking element, this is also referred to as synchronization. This enables the ECU to know 360 degree position of the crankshaft. The ECU must then use the signal of the cam sensor to determine if the crankshaft is in the first revolution or the second revolution. Thus, if there is a break in the information from the crankshaft sensors, the ECU will lose the position of the crankshaft and will not know whether the crankshaft is in the first revolution or the second revolution. Consequently, the ECU cannot determine which cylinder should be injected with fuel or not (e.g. with respect to a typical diesel engine, whether the cylinder is in the power stroke or exhaust stroke). If a break in the crank sensor information occurs, the engine may be rendered incapacitated.

One attempt to minimize this problem has been to provide two crank sensors; the idea being that one crank sensor acts as a back-up sensor to the other. According to this configuration, the ECU will receive signal information from one of the sensors. If a failure happens, the ECU will effectuate a "switchover" to the other sensor. Having a redundant sensor does address the problem somewhat, but there remain important performance issues. In the event of a failure of the active sensor, the ECU loses engine position and is incapable of calculating speed. The ECU must stop fueling until synchronization is complete on the redundant sensor. The synchronization of the crank sensor signals and determination of the proper crank revolution requires time. The cessation of fuel injection during this time dramatically decreases engine performance.

DETAILED DESCRIPTION

This application builds on the advancements disclosed in Co-pending U.S. application Ser. No. 10/855,914 ('914 application) filed May 27, 2004, which is incorporated herein in its entirety to the extent not inconsistent with the teachings herein. The '914 application disclosed, inter alia, new 'bumpless' crankshaft positioning systems for sensing crankshaft positioning that alleviated many of the problems experienced with a "switchover" from one crankshaft sensor to another when it is determined that a crankshaft sensor is malfunctioning. In working on improving upon the significant advancement of bumpless crankshaft position sensing, the inventors have identified that, in some instances, electromagnetic radiation may cause disturbance issues in the bumpless system. Locomotives are manufactured in two different models, those with an AC-electric drive system and those with a DC-electric drive system. The generator is utilized during engine start-up to turn the diesel engine. This operation consumes large amounts of electric power, and creates a significant amount of magnetic radiation. The magnetic radiation can be picked up by the crank sensors and generate transient or other unwanted phenomena. Accordingly, the inventors have enhanced the crankshaft positioning to reject these disturbances thereby achieving a more robust virtual crank signal. This and other advantageous aspects will be described further herein.

One embodiment pertains to a noise-resistant method of monitoring crankshaft position of an internal combustion engine. The method comprises providing a rotating member operationally coupled to said crankshaft, wherein said rotating member comprises a plurality of spaced elements and at least one reference element provided with a different spatial characteristic thereon; providing one or more crankshaft positioning sensors proximate to said rotating member so as to allow generation of at least one corresponding crank signal streams responsive to rotation of said rotating member; monitoring for crank signal generation during a predetermined inspection window, wherein, during undisturbed crank signal generation, a predefined number of crank signals occur in said predetermined inspection window; generating a virtual crank signal stream derived from crank signals of at least one crank signal stream, i) said virtual crank signal stream persisting despite an addition of one or more false crank signals or deletion of one or more true crank signals that occur during said predefined inspection window;
ii) said virtual crank signal stream comprising a phase relative to said crankshaft that is monitored and maintained to correlate to a predicted location of said crankshaft despite noise on a crank signal stream;
iii) said virtual crank signal stream being monitored for integrity of the reference element of said virtual crank signal stream, wherein if the integrity of said reference element is violated, protection of said engine is initiated;

whereby said virtual crank signal stream is useful to achieve noise-resistant monitoring of crankshaft position.

Another embodiment pertains to an engine control system for an internal combustion engine, wherein said engine comprises at least one cylinder, each cylinder retaining a piston, and wherein a crankshaft is operationally coupled to the pistons such that the crankshaft rotates twice per engine cycle and the position of each piston depends upon the rotational position of the crankshaft, said engine control system comprising: (a) a signal processor, wherein said signal processor is configured to receive signals from one or more crank positioning sensors; (b) a rotating member arranged to rotate responsive to rotation of said crankshaft, said rotating member comprises a plurality of spaced elements and at least one reference element provided with a different spatial characteristic thereon; (c) one or more crank positioning sensors proximate to said rotating member so as to allow generation of one or more corresponding crank signal streams responsive to rotation of said rotating member; wherein said signal processor comprising at least one processing module; at least one memory device operationally coupled to said at least one processing module; and program code modules stored in said signal processor:

a computer readable first program code module for causing said signal processor to monitor for crank signal occurrence in a series of inspection windows in which, based on upstream crank signal period measurements, one or more crank signals are expected to be located;

a computer readable second program code module for causing said signal processor to accept or reject a given crank signal depending on relationship between actual location and expected location of said given crank signal; and a computer readable first program code module for causing said signal processor to employ current or previously accepted crank signals, or both, to synthesize a virtual crankshaft positioning signal stream that correlates with crankshaft position;

wherein said virtual crankshaft positioning signal stream is useful for monitoring crankshaft position.

Figure 1A:
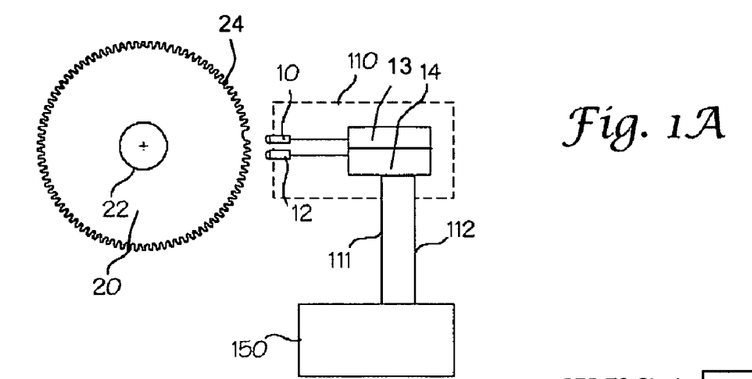
FIG. 1A shows a diagram of a crankshaft positioning apparatus according to one embodiment.

FIG. 1A shows components of a system embodiment. It is separated into 6 components, the crank wheel, the two crank sensors, the two Analogue Front-End interfaces, AFEs, and the FPGA (signal processor). FIG. 1A shows a crank interface 110 and signal processor 150 receiving signals sent from the crank interface for use in conjunction with an internal combustion engine. The crankshaft 22 drives a rotating member 20. The apparatus 110 comprises a first crank positioning sensor 10 and a second crank positioning sensor 12 which are communicatingly connected to a first and second interface (also referred to as analog front-end interface, or 'AFE'), 13 14, which converts analog signals to digital signals. The first and second crank positioning sensors 10, 12, and the interfaces 13, 14 together comprise the crank interface 110. From the interfaces 13, 14, digital signals from the first and second crank positioning sensors 10, 12 are sent to a signal processor (FPGA, see FIG. 1B) 150 via lines 111 and 112, respectively. The FPGA merges the information contained in the two signals and forms a virtual crank sensor signal. The rotating member 20 may be any conventional crank wheel or similar device comprising various elements.

Shown in FIG. 1A, the rotating member 20 pertains to a crank wheel comprising a 90 minus 1 teeth elements 24 which produce a signal as each element passes by said first and second crank positioning sensors 10, 12. Of the 90 available teeth positions, only 89 are equipped with teeth, leaving one position empty. The missing tooth is used by the control system to locate the beginning of each revolution. The two crank positioning sensors 10, 12 are mounted close to the edges of the teeth elements 24, and separated vertically by about 3 teeth. When the crank wheel is spinning, the tooth tips and tooth gaps sweeps across the sensor probes, which registers the difference in distance. The sensor probes utilize magnetic radiation to measure the distance to the tooth tip or tooth gap. The output signal is therefore sinusoidal shaped with amplitude that increases with the speed of the crank wheel. The analogue sensor signals are fed unfiltered to the interfaces 13, 14. The interfaces 13, 14 detects the zero crossings of the analogue signals and forms a digital signal with appropriate amplitude. A mild filtering algorithm is also applied to the sensor signals in the interfaces 13, 14. The signal processor 150 comprises electrical and software components to receive and process the output signals from the first crank positioning sensor 10 and the output signals from the second crank positioning sensor 12, such that the signals from the second crank positioning sensor 12 are modified to emulate the signals from the first crank positioning sensor 10. Employing the signals from either the first crank positioning sensor 10 or the second crank positioning sensor 12, the signal processor 150 produces an active crank series of signals, wherein the active crank series of signals persists despite operational failure of either the first crank positioning sensor 10 or second crank positioning sensor 12.

Figure 1B:
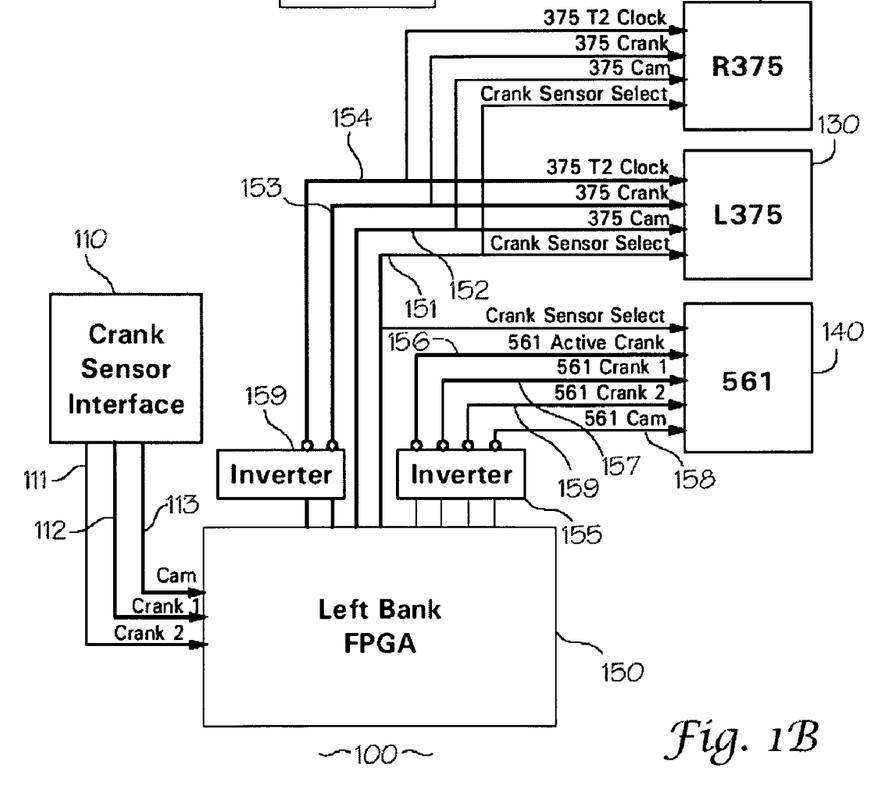
FIG. 1B shows a diagram of an engine control system according to an embodiment.
Figure 2:
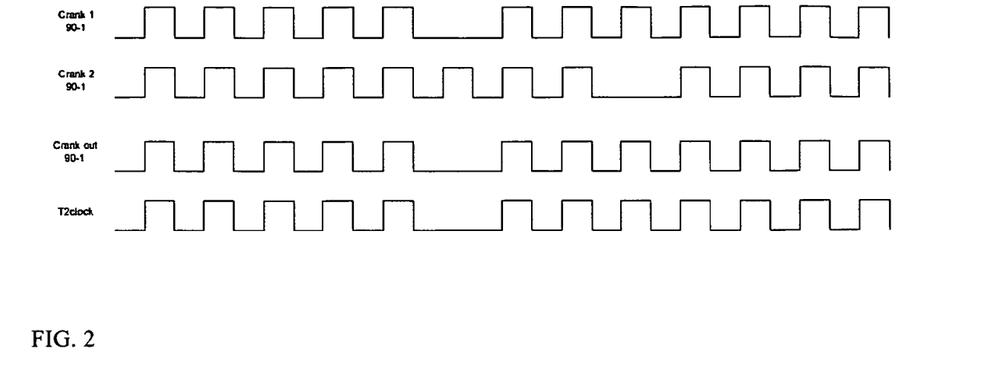
FIG. 2 shows a signal graph demonstrating the merging of two signals according to another embodiment.

FIG. 1B shows a diagram of an exemplary engine control system 100 utilizing the crank interface 110 and signal processor 150 shown in FIG. 1A. By way of context, the system is utilized to determine the position of a crankshaft of a running internal combustion engine and control operations in said engine. The engine has cylinders defined therein, and pistons possessing rods which are operationally coupled to a crankshaft. Further, the rotating member is operationally coupled to the crankshaft such that the rotating member rotates two cycles per one engine cycle. First and second crank sensors are mounted in proximity to a crankshaft rotating member represented by the crank sensor interface 110. The first crank positioning sensor and second crank positioning sensor are connected via lines 111 and 112, respectively (also shown as Crank 1 and Crank 2), to a first processor 150 (also shown as Left Bank FPGA). Generally, "lines" as used herein refers to wires or other conductive means for communicating electrical signals. In a typical embodiment, the rotating member comprises a wheel having a plurality of equidistantly spaced elements, with at least one element missing (gap). As the rotating member rotates, the equidistantly spaced elements and gap(s) pass by the first and second crank sensors thereby producing a continuous series of signals. The signal processor 150 processes the signals received from first and second crank positioning sensors such that the series of signals from the second crank positioning sensor emulate the series of signals from the first crank positioning sensor. The series of signals from the first and second crank positioning sensors are employed to form an active crank series of signals (also shown as 375 Crank). The engine control system may further comprise at least one engine control processor communicatingly connected to the signal processor. The engine control processor comprises programming (software) and/or circuitry to direct certain actions in the engine, such as, but not limited to, injection of fuel into cylinders and/or ignition of fuel. The engine control processor directs these actions based on the active crank series of signals and cam signals from the signal processor. Accordingly, the signal processor 150 sends the active crank series of signals to a first engine control processor 120 (also shown as R375) and a second engine control processor 130 (also shown as L375) via line 153.

In addition to the active crank series of signals, the signal processor 150 generates a clock series of signals, which is a duplicate of the active crank series of signals. The origination of the clock series of signals and their function is described in more detail, infra. The clock series of signals is sent to the first and second engine control processors 120, 130 via line 154 (also shown as 375 T2 clock).

The signal processor also receives cam signals from a camshaft sensor (not shown) via line 113 (also shown as CAM). The cam series of signals is sent to the first and second engine control processors 120, 130 via line 152 (also shown as 375 cam).

FIG. 1B also shows a master processor 140. The master processor is not critical to operation of the crankshaft position sensing system 100 but may be employed to conduct various analyses of the system 100. The master processor 140 receives the signals from the first and second crank positioning sensors via lines 157 and 159, respectively (also shown as 561 crank 1 and 561 crank 2), without being processed. The master processor 140 also receives cam signals via line 158 (also shown as 561 cam), as well as the active crank signal series via line 156 (also shown as 561 active crank). The first engine control processor, the second engine control processor, and the master processor all receive a crank status signal via line 151 (also shown as Crank sensor select).

The first and second engine control processors 120, 130 are responsible for the operation of a bank of cylinders each (typically 6 or 8 cylinders based on 12 or 16 cylinder engines, respectively). Accordingly, in a 16 cylinder engine, the typical arrangement would comprise a left and right signal processor which are each in communication with two engine control processors, which each control a bank of 8 cylinders.

The system 100 also comprises external signal inverters 159 and 155 (also shown as Inverter). During processing, the signal processor 150 inverts the active crank signals and the clock signals. The external signal inverter 159 inverts these signals. The inverter also provides a robust (+5V) push pull signals that are more resilient to interference.

The locomotives are manufactured in two different models, those with an AC-electric drive system and those with a DC-electric drive system. The generator is utilized during engine start-up to turn the diesel engine. This operation consumes large amounts of electric power, and creates a significant amount of magnetic radiation. The magnetic radiation can be picked up by the crank sensors and generate transient or other unwanted phenomena. These disturbances are, if they propagate through to the FPGA, noted as extra inserted teeth. If unaccounted for, extra inserted teeth can lead to severe problems, such as mis-firing, and mechanical fatigue and/or damage to the engine. In addition to the requirement that the FPGA algorithm is to provide a virtual sensor signal, a number of requirements for the disturbance rejection properties of the FPGA-based signal processing algorithm are stipulated. These requirements are based on the disturbance scenarios shown in following figures.

Figure 3A:
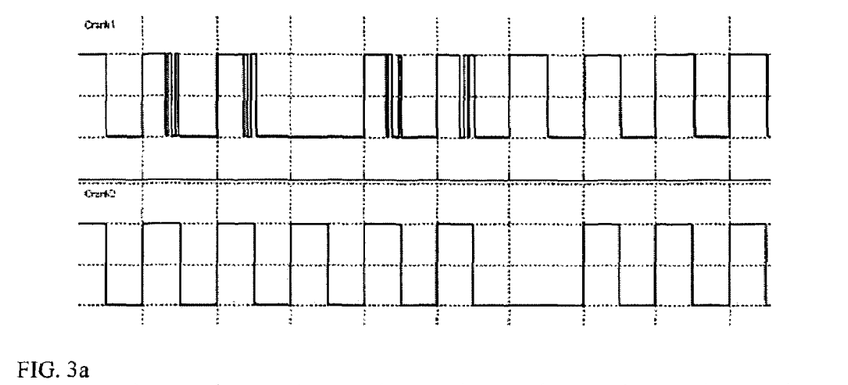
FIG. 3a-c shows signal graphs pertaining to different signal disturbance scenarios.
Figure 3B:
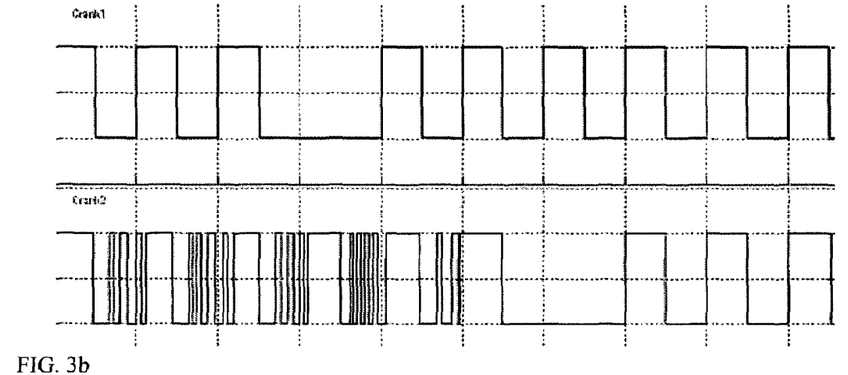
Figure 3C:
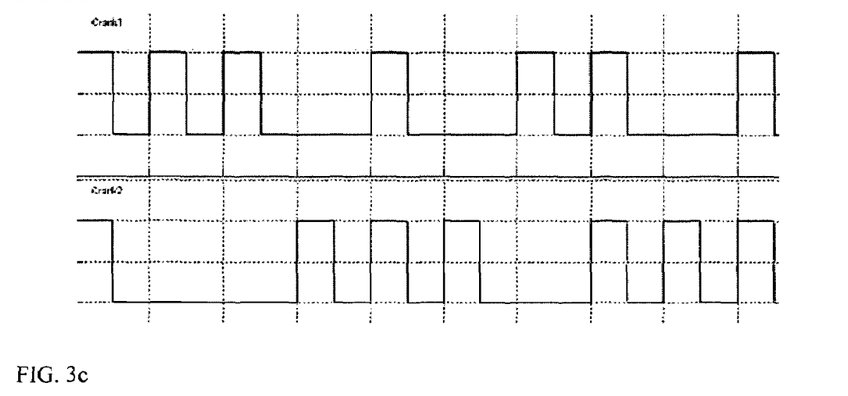

FIG. 3a describes a disturbance scenario in which the FPGA notes one or more additional teeth close to the falling edges of the un-disturbed signal. FIG. 3b describes a similar scenario, however, in this case the disturbances occur near the rising edges of the un-disturbed signal. FIG. 3c finally describes a disturbance scenario where a tooth has been completely removed either due to disturbances or damage to the crank wheel. Given these disturbance scenarios, following requirements has been stipulated.

In one embodiment, the missing tooth gap for the virtual crank sensor signal is aligned with the missing tooth gap for the first crank sensor signal. The virtual crank sensor signal should not have more than 89 teeth. If a disturbance, similar to any of those described in FIGS. 3a-c affects only one sensor, the virtual crank sensor output should not be affected. If a disturbance, similar to any of those described in FIGS. 3a-c affects both sensors simultaneously and occurs not more frequent than during two teeth per revolution, the virtual crank sensor output should not be affected. If teeth 89 and 1 are removed, the virtual crank sensor output should not be affected. If teeth 2, 3 and 4 are removed, the virtual crank sensor output should not be affected.

A phase shift, between the virtual crank sensor output and the crank wheel, typically is not to be allowed for more than 7 crank revolutions. If a sensor is continuously disturbed, the sensor should be de-activated (the term de-activate(d) or de-activation as used herein in relation to crank positioning sensors means that the information from the sensor is ignored and therefore not used in the computation for synthesizing the virtual signal, not that the crank sensor is shut down or modulated), and re-activated first when it has been free from disturbances for some period of time. In addition to these requirements, the signal processing algorithm should be able to detect crank signals belonging to the range of engine speeds that spans from 30 RPM to 1200 RPM. Within this range, the algorithm must be able to cope with the following acceleration/deceleration levels:

| Engine speed range [RPM] | Acceleration/ requirements [RPM/s] | Achieved performance, no disturbances [RPM/s] |
|---|---|---|
| <60 | 100 | >225 |
| 60 to 200 | 380 | >507 |
| 200 to 1200 | 1000 | >5600 |

The following is a list of the features provided by, and properties of, an exemplary embodiment of the FPGA algorithm implemented in signal processor 150. The embodiment comprises one or more of the following features.

The algorithm merges the measurement information obtained from two crank sensor measurements and forms a single virtual crank sensor signal that is free from disturbances.

The missing tooth gap for the virtual crank sensor signal is aligned with the missing tooth gap for the first crank sensor signal.

The measurements obtained from the two crank sensor measurements are filtered to remove disturbances.

Disturbances are sensed by the FPGA algorithm as a series of narrow teeth, or, alternatively, as no teeth at all, the latter occur when disturbance prevents a zero crossing thus inducing extra missing teeth.

The filtering procedure employs an inspection window, within which the algorithm expects to find exactly one tooth for each crank sensor channel.

If the algorithm detects that a tooth is missing or disturbed on one of its crank sensor measurements, the algorithm discards that measurement information and relies on the measurements obtained from the other crank sensor signal.

If the algorithm detects that teeth are missing or disturbed on both of its crank sensor measurements, the algorithm then assumes that the engine speed remains constant and proceeds under the assumption that a tooth edge was found at T=TS+PT where T denotes the time in absolute terms, TS denote the time-based location of the last tooth edge and PT denotes the current estimate of the tooth period time.

The current estimate of the tooth period time (PT) is the average of the tooth period times for the last four teeth. This average filtering scheme is to further improve the algorithm's robustness against disturbances.

If the algorithm senses that a particular crank sensor measurement is disturbed for more than 3 teeth during one revolution, the algorithm temporarily de-activates that particular crank sensor measurement. While the crank sensor measurement is de-activated the algorithm automatically discards all measurement information arriving from that sensor signal.

To re-activate a de-activated sensor signal the algorithm requires that no disturbances occur for one full revolution. Here meaning from one missing tooth gap to the next. Thus if the sensor remains disturbance free from tooth #70 of a particular revolution to tooth #80 of the next revolution the sensor will not be reactivated. But if the sensor remains disturbance free from tooth #70 of a particular revolution to tooth #89 of the next revolution the sensor will be re-activated.

The tooth period time PT is not updated during the missing tooth gap phase. Hence, if both sensors are activated the PT is not updated during tooth #90 and tooth #3. If the first crank sensor signal is active and the second crank sensor signal remains de-activated PT is not updated during tooth #90, but is updated during tooth #3.

The phase shift between the two crank sensor measurements must always be less than 0.25 crankshaft degrees. If the phase shift is larger than 0.25 degrees the algorithm will use the crank sensor measurements that is closest to the previously calculated time period.

If teeth are detected during the missing tooth gaps, when the algorithm expects to find no teeth, there is a possibility that there is a large phase shift between the virtual crank sensor signal and the crank sensor measurements. This can potentially damage the engine. The algorithm therefore monitors the sensor activity during the missing tooth gaps. If a phase shift is detected the engine will run for a maximum of seven revolutions.

If both crank sensor signals are activated, and no disturbances affect the crank sensor measurements, or if the disturbances affect only one of the crank sensor measurements, the maximum acceleration/deceleration levels the algorithm can handle are given by the following table.

| Speed (RPM) | Acceleration (RPM/s) |
|---|---|
| 40 | 225 |
| 60 | 507 |
| 100 | 1408 |
| 200 | 5600 |
| 300-1200 | >5600 |

If only one crank sensor signal is activated, and disturbances affect its measurements, of both sensors are active and disturbances affect both measurements simultaneously, the maximum acceleration/deceleration levels the algorithm can handle are given allowing table:

| Speed (RPM) | Acceleration (RPM/s) |
|---|---|
| 40 | 197 |
| 60 | 443 |
| 100 | 1232 |
| 200 | 4927 |
| 300-1200 | >4927 |

In a worst-case scenario, when both sensors are active and disturbances affects both tooth #1 and tooth #2, PT will not be updated for 4 consecutive teeth due to the rule that PT is not updated during the missing phase. The maximum acceleration/deceleration levels the algorithm can handle under these conditions are given by the following table.

| Speed (RPM) | Acceleration (RPM/s) |
|---|---|
| 40 | 71 |
| 60 | 161 |
| 100 | 447 |
| 200 | 1791 |
| 300-1200 | >4031 |

The FPGA algorithm may experience difficulty tackling disturbances that cause the tooth edges to shift their positions. If the change of the position is less than +−1 crankshaft degrees, and affects both sensor signals simultaneously, the FPGA algorithm fails to detect this disturbance. The average filtering scheme, employed when updating PT, helps to reduce the influence of this problem, but cannot completely eliminate its influence on the virtual crank sensor signal.

Analogue Front-End (AFE) Interface—Filtering characteristics

Figure 4A:
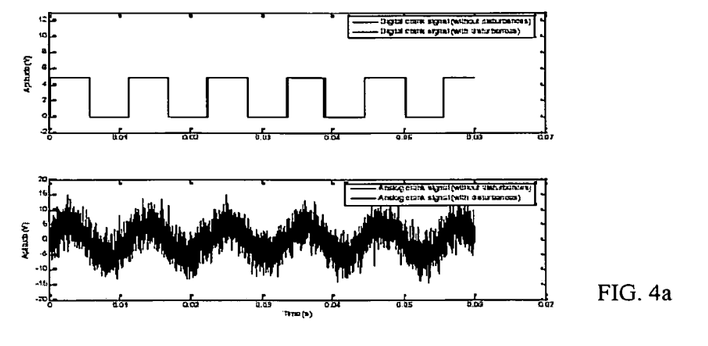
FIG. 4a-c shows signal graphs pertaining to signals obtained during simulations to show differences of disturbance events at different RPMs
Figure 4B:
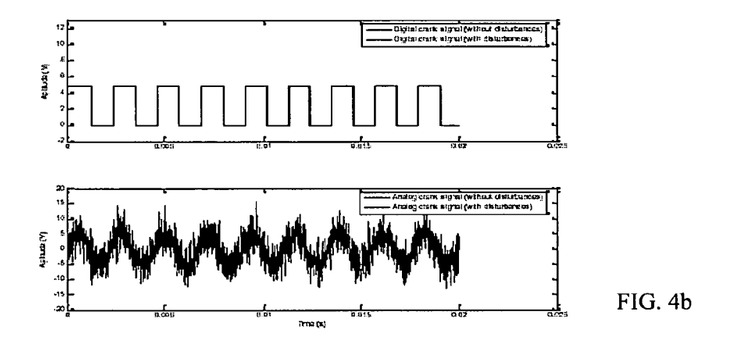
Figure 4C:
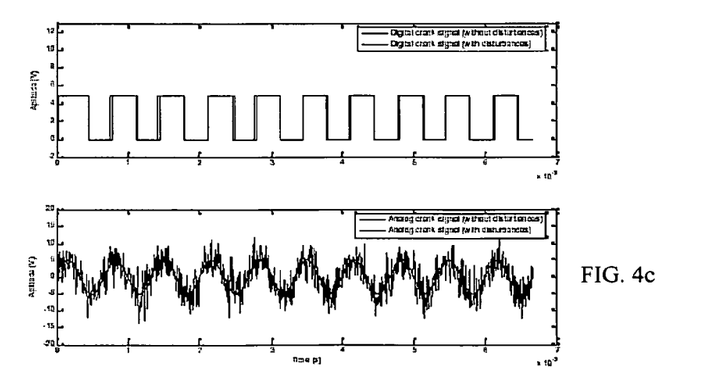

The AFE, (13 or 14, FIG. 1A) is designed to digitize sensor signals subjected to modest disturbances. The non-linear design of the AFE provides for a relatively effective system to protect against large disturbances. To verify this fact, a simulation model of the AFE has been created and numerical simulations has been carried out for a range of different simulation scenarios where the sensor signal is subjected to a white noise sequence with large amplitude (variance). Simulation has been carried out for sensor signals corresponding to 60 RPM, 300 RPM and 1000 RPM. The results from these simulations are shown in FIG. 4a-c.

The simulations reveal that when the input signal is subjected to noise, small errors are introduced near the falling and rising edges of the digitized signal. The errors are noted as small differences in when the falling and rising edges occur. Occasionally, extra inserted teeth can also be noted. This, however, occurs only at lower RPMs. Finally, it should be noted that at the noise level used in these simulations (which is significant), the errors are small and therefore of little significance.

Timing Characteristics of the Digital Crank Sensor Signals

Since the crank wheel is mechanically linked to the engine, it will always spin with the same speed as the engine. Given the engine speed, the tooth frequency can be computed using formula 2-1.

$$\text{Tooth Frequency} = W \times 90/60 [\text{Teeth}/s] \quad (2\text{-}1)$$

W denotes the engine speed (in RPM). By inverting the tooth frequency the tooth period time can be computed using formula 2-2.

$$\text{Tooth Period} = PT = 1/\text{Tooth Frequency} = 60/(W \times 90)[s/\text{Tooth}] \quad (2\text{-}2)$$

During acceleration and deceleration of the engine, the tooth period changes between two consecutive teeth. From an algorithmic perspective it is important to know how big this change is. In order to derive a formula for this, recall that, given an acceleration or deceleration speed, A [RPM/s], the change in speed can be expressed as in formula 2-3.

$$W1 = W0 + dt \times A \quad (2\text{-}3)$$

In formula 2-3 dt refer refers to the time elapsed between measuring the speeds W0 and W1. If it is assumed that the speed changes linearly between two consecutive tooth edges the tooth period time, PT, can be computed using formula 2-4.

$$PT1 = (60 \times 2)/((W0 + W1) \times 90) \quad (2\text{-}4)$$

Now, by combining (2-3) with (2-4), 2-5 is obtained.

$$PT1 = (60 \times 2)/((W0 + W0 + PT1 \times A) \times 90) \quad (2\text{-}5)$$

Formula 2-5 is a second order polynomial equation that has solution 2-6.

$$PT1 = ((W0/A)2 + (2 \times 60)/90/A)0.5 - W0/A \quad (2\text{-}6)$$

Consequently, by combining formula 2-6 and formula 2-2 it is possible to compute a measure of the change in PT between two consecutive teeth. At high speeds, even high acceleration terms, produce small changes in PT. At low speeds, even small acceleration terms have a large influence. To satisfy the requirements on acceleration/deceleration the algorithm must accept at least a 4% change between two consecutive teeth.

As will be appreciated by one of skill in the art, embodiments of the present invention may be embodied as a device or system comprising a processing module, and/or computer program product comprising at least one program code module. Accordingly, the present invention may take the form of an entirely hardware embodiment or an embodiment combining software and hardware aspects. Furthermore, the present invention may include a computer program product on a computer-usable storage medium having computer-usable program code module embodied in the medium. Any suitable computer readable medium may be utilized including hard disks, CD-ROMs, DVDs, optical storage devices, or magnetic storage devices.

The term "processing module" may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module may have operationally coupled thereto, or integrated therewith, a memory device. The memory device may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module.

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

These computer program code modules may also be stored in a computer-readable medium that can direct a computer or other programmable data processing apparatus to function in a particular manner, such that the program code modules stored in the computer-readable medium produce an article of manufacture.

Figure 7:
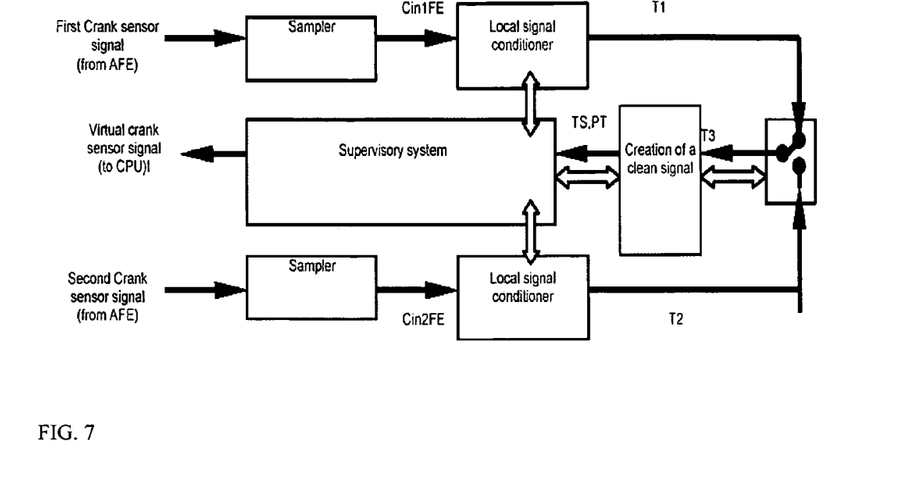
FIG. 7 shows a block diagram of the architecture of a FPGA algorithm according to one embodiment.
Figure 8:
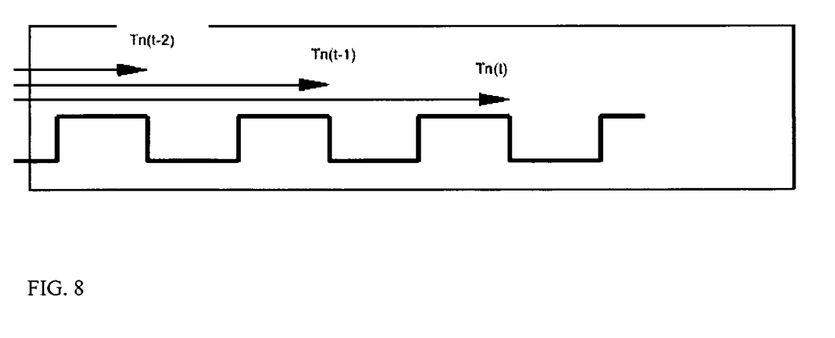
FIG. 8 shows a signal graph to illustrate the storage of timer values according to another embodiment.

A block schematic representation of the architecture of an exemplary signal processor (FPGA) is shown in FIG. 7. The signal processor comprises computational resources such as hardware components (circuitry, processing module(s), memory device(s)) and executable computer program modules (collectively referred to herein as FPGA algorithm) stored thereon. As shown in FIG. 7, the signal processor utilizes separate signal paths for the two crank sensor inputs. The two dedicated signal conditioners ensures that the raw measurements are diagnosed and cleaned from severe disturbances before the measurements are passes on to the supervisory system. The supervisory system merges the information obtained from the two input channels, and forms a 'cleaned' crank sensor measurement, free from noise. The 'cleaned' measurement signal is further diagnosed and processed by the supervisory system, such that more subtle disturbances can be removed. The processed 'cleaned' measurement signal then serves as a basis for the virtual crank sensor output. In a specific embodiment, the FPGA hardware is samples the digitized crank signals at 24 MHz, meaning that each tooth spans a large number of samples. If the FPGA algorithm, internally, were to use a sample-based representation of the digitized crank signal, large amounts of memory would be required. Since minimizing the memory resources available on the FPGA hardware is desired, a different representation scheme is provided. For this reason, the FPGA algorithm employs a tooth-based representation of the crank signal, where only one variable, as shown in FIG. 8, are needed to represent each tooth. The variable Tn denotes the time when a new tooth starts, which here is defined as the time when a falling edge occurs. Though the time period between falling edges of teeth is specifically exemplified herein as a signal period, it should be understood that other signal types may be implemented. For this reason, the term 'pulse period' is used herein in its most generic sense to refer to a period of signal for from a series of signals, i.e. time period between a predetermined starting point and stopping point for a signal which will be common for all signals in the series. Furthermore, the terms 'signal' and 'pulse' are used interchangeably herein.

Black arrows indicate the primary path for the signals, while the white, and thick, arrows indicate the signal path for the control signals. The labels T1, T2, T3, TS, Cin1FE, Cin2FE and PT correspond to variable names in the FPGA algorithm.

Since there are two input signals, the sampling system is divided into two input channels—one connected to the first crank sensor and one connected to the second crank sensor. Note also that the FPGA algorithm utilizes separate timer registers for the two input channels (denoted T1 and T2), but stores only the most recent timer value (and does not maintain a history of past timer values). The sampling system for each input channel is furthermore divided into two separate processes—a sampler and a signal conditioner. The samplers are responsible for detecting the falling edges, while the signal conditioners, based on a set of detection rules, are responsible for registering the time stamps of the falling edges in the corresponding channel registers, T1 or T2.

EXAMPLE I

Operational Modes of FPGA Algorithm

Most of the sub-systems depicted in FIG. 7 changes their operational behaviour depending on the current operational mode. The FPGA algorithm has two different master modes—a synchronization mode and a normal operating mode.

A. Behaviour During the Normal Operating Mode

To make the FPGA code more efficient and less resource intensive, the two sampler processes lack built-in intelligence, and thus cannot establish whether a falling edge is triggered by a disturbance or an actual tooth edge. Instead the sampler, blindly, registers every falling edge, leaving it to the remaining sub-systems to either discard or accept its measurements. In its current form, the FPGA algorithm employs a two-level filtering procedure to decide how to respond to the falling edges registered by the two samplers. At the lower level, the filtering is carried out by the signal conditioning processes, and at the upper level, the filtering is carried out by the supervisory system. It should also be noted that only at the supervisory level does the filtering process take into account both signal paths. Thus, the filtering carried out by each signal conditioner process has knowledge only of the readings obtained from the local sampler. The main aim of the two-level filtering structure employed by the FPGA algorithm is to enable the formation of an internal representation of a 'cleaned' measurement signal. The general idea is to gradually 'clean' the measurement readings as they are passed along the signal path, until they reach a cleanliness-state where they can be used as a basis for the virtual crank sensor output. To reach the desired level of cleanliness for the 'cleaned' measurement signal, a wide range of filtering techniques is employed. While on the outset these techniques appear very different, they all make use of the following two fundamental concepts:

1. Both the upper and lower level of filtering procedures rely on the assumption that the tooth frequency changes only very little between two consecutive teeth, i.e. (T1(t−1)−T1(t−2)) is roughly equal to (T1(t)−T1(t−1)). Under this assumption the FPGA algorithm can predict, by inspecting past occurrences of falling edges, roughly when the next falling edge is expected to occur. To enable this feature, however, the FPGA algorithm needs to maintain a history of past timer values. For this reason the supervisory system maintains two additional time stamp registers, TS and PT. The 21-bit register TS holds the time stamp for the end of the previous tooth (hence the start of the current tooth) and the 21-bit register PT holds the current tooth period. Thus, provided the engine speed remains constant, the next tooth edge (falling edge) is to be found at: TS+PT. Note that both TS and PT are managed by the supervisory system, and together characterizes the shape of the 'cleaned' measurement signal.

2. The second concept, central to both filtering procedures, is the use of an inspection window. For each new tooth that the FPGA algorithm tries to detect a new inspection window is created. Each window starts on the edge of the previous window and ends at: 1.25×PT+TS (i.e. when T>=1.25×PT+TS). When the inspection window expires, the FPGA algorithm analyses the measurements obtained from both input channels, and provided a valid tooth has been detected on either or both channels, the FPGA algorithm updates the contents of the registers TS and PT. In the unlikely event that the FPGA algorithm fails to detect a valid tooth for the duration of the first inspection window, the FPGA algorithm extends the inspection window to: 2.5×PT+TS1. The FPGA algorithm employs a flag, LongT, to indicate the size of the inspection window. Admittedly, a much easier and less complex solution in the latter case, would have been to simply assume that a valid tooth was detected at TS+PT and update TS and PT accordingly (in such a case PT and TS would have been updated according to: PT=PT, TS=TS+PT). The reason for choosing the more complex approach is that it provides for better accuracy in some instances. It should be noted that if the extended detection window is already in use, and the FPGA algorithm yet again fails to detect a valid tooth, the FPGA algorithm updates TS according to: TS=TS+PT, and thereafter proceeds as before, with an extended inspection window in place (i.e. the detection window is shifted one tooth). Following the detection of a valid tooth, the inspection window is always reset to normal.

In general terms, the two-level filtering structure is not only separated by execution context (here meaning the subsystem in which they are implemented, i.e. supervisory system or signal conditioner system), but also separated by the type of disturbances they tackle. The filtering procedures executed by the signal conditioner processes are designed to tackle rapid disturbances—disturbances that can be detected within the inspection window. By contrast, the supervisory level filtering procedures can detect much more slow-moving disturbances, which spans several inspection windows.

B. Low-Level Filtering—Signal Conditioners

The two signal conditioners—one for each input channel—carries out low level filtering on the input signals and manages each input channel's time stamp register (T1 or T2). In addition, the signal conditioner systems also manage various status registers and flags, which are used by the supervisory system to de-activate and activate the sensor signals (more about activation and de-activation below). In order to communicate with the supervisory system, the signal conditioner processes utilizes the following flags and registers:

T1 or T2: These 21-bit registers hold the time stamp of the last falling edge.

C1 Valid or C2 Valid: These flags are used by the supervisory system to establish if the values contained in T1 or T2 corresponds to a valid tooth edge. These flags are checked by the supervisory system after the inspection window has expired.

PCL1 or PCL2: These 7-bit registers essentially communicate the failure rate of the input channel. When the PCL-registers reaches zero, the input channel is de-activated by the supervisory system, here meaning that the supervisory system will discard the data arriving from the input channel (the sampler and signal conditioner will still be active, trying to detect teeth, and trying to become re-activated).

The supervisory system uses a flag, Slave1 or Slave2, to communicate activation/de-activation status to the signal conditioners. If the flag is set to true, the input channel is currently de-activated.

At the start of each new inspection window the signal conditioner process is reset, here meaning that the process is reset to its idle state and that the flags C1Valid/C2Valid are reset to false (the contents of the PCL1/PCL2-registers and T1/T2-registers remain unchanged and the status of the Slave1/Slave2 flags remain unaltered). Throughout the inspection window the signal conditioner process monitors the sampler activity. Whenever the sampler process signals that a falling edge has occurred the signal conditioner follows the following set of rules to determine if the current edge corresponds to a disturbance or an actual tooth-edge:

1. If the edge occurred inside the window defined by: $0.75 \times PT <= T - TS <= 1.25 \times PT$ (or $1.5 \times PT <= T - TS <= 2.5 \times PT$ if an extended inspection window is used), and the flag C1Valid/C2Valid is false, the flag C1Valid/C2Valid is set to true (i.e. signal to the supervisory system that the current tooth is valid) and T1/T2 is set equal the current time (T).

2. If the edge occurred inside the window defined by: $0.75 \times PT <= T - TS <= 1.25 \times PT$ (or $1.5 \times PT <= T - TS <= 2.5 \times PT$ if an extended inspection window is used), and the flag C1Valid/C2Valid is already set to true (i.e. this is the second falling edge during this inspection window), the flag C1Valid/C2Valid is set to false (i.e. signal to the supervisory system that the current tooth is invalid) and the signal conditioner process will, for the remainder of the detection window, discard all data arriving from the sampler.

3. If the edge occurred outside the window defined by: $0.75 \times PT <= T - TS <= 1.25 \times PT$ (or $1.5 \times PT <= T - TS <= 2.5 \times PT$ if an extended inspection window is used), the flag C1Valid/C2Valid is set to false (i.e. signal to the supervisory system that the current tooth is invalid) and the signal conditioner process will, for the remainder of the detection window, discard all data arriving from the sampler. At the end of the inspection window, prior to the reset, the signal conditioners update the contents of the PCL1/PCL2 registers. If the input channel is active (i.e. Slave1/Slave2 is set to false) the PCL1/PCL2 register is updated according to the following rules:

1. If the flag C1Valid/C2Valid is set to true, then the PCL1/PCL2 register is incremented by unity (89 is the maximum value).

2. If the flag C1Valid/C2Valid is set to false, then the PCL1/PCL2 register is decremented by 24 (0 is the minimum value). The un-symmetric counting mechanism employed for the PCL1/PCL2 registers, means that if 4 teeth, within 89, are deemed invalid by the signal conditioner, the PCL1/PCL2 register reaches 0 and the input channel is subsequently de-activated. Once the sensor has been de-activated the signal conditioner process employs the following update rules for the PCL1/PCL2 register:

1. If the flag C1Valid/C2Valid is set to true, then the PCL1/PCL2 register is incremented by unity (89 is the maximum value).

2. If the flag C1Valid/C2Valid is set to false, then the PCL1/PCL2 register is decremented to 0.

Since the supervisory system will re-activate a de-activated sensor, first when the PCL1/PCL2 register reaches 89, these update rules implies that 89 valid consecutive teeth are required for the sensor to become re-activated (if the sensor is currently de-activated).

C. High-Level Filtering and the Updating of the Registers TS and PT

At the end of each inspection window the supervisory system receives the status flags and time stamps from the signal conditioners. The supervisory system further analyses this data, and then merges these measurements into a 'cleaned' measurement signal, characterised by the registers TS and PT. During the analysis and processing of the measurement readings and status flags, the supervisory system forms an intermediate signal, characterised by the 21-bit time-stamp register T3. The filtering procedure employed by the supervisory system can therefore be divided into two steps:

1. Diagnose the measurements and status flags obtained from the two input channels, and if at least one of the channels has registered a valid tooth, compute a 'merged' time stamp, and store this value in the register T3.

2. Use the value stored in the register T3 to update TS and PT.

In order to merge the readings obtained from the two input channels, the supervisory system employs the following rules (these rules are executed after each inspection window has expired):

1. If both Slave1 and Slave2 are set to: false (i.e. both signal paths are active), and if both C1Valid and C2Valid are set to: true (i.e. both input channels have registered a valid tooth), then the following rules apply:
   a. If the phase delay between the two sensor signals are less than, or equal to, 0.25 degrees (i.e. $T1-T2 <= 0.0625 \times PT$ or $T2-T1 <= 0.0625 \times PT$ depending on which of the signals is leading), then the supervisory system will set T3 to equal the average between T1 and T2 (i.e. $T3=T1+(T2-T1)/2$ if T1 is leading and $T3=T2+(T1-T2)/2$ if T2 is leading).
   b. If the phase delay between the two sensor signals are larger than 0.25 degrees, the supervisory system discards the readings obtained from one of the channels, and thus set T3 to either T3=T1 or T3=T2. In order to decide which of the signals to discard, the supervisory system evaluates the distance between the actual falling edge (T1 or T2) and the predicted falling edge (TS+PT). The signal furthest away from the predicted location is discarded.

2. If Slave1 is set to: true, or if C1Valid is set to: false (i.e. if the signal is either de-activated or disturbed) and C2Valid is set to: true, and Slave2 is set to: false, then the supervisory system sets T3 to: T3=T2.

3. If Slave2 is set to: true, or if C2Valid is set to: false (i.e. if the signal is either de-activated or disturbed) and C1Valid is set to: true, and Slave1 is set to: false, then the supervisory system sets T3 to: T3=T1.

4. If none of the above is true T3 is not updated.

Figure 5:
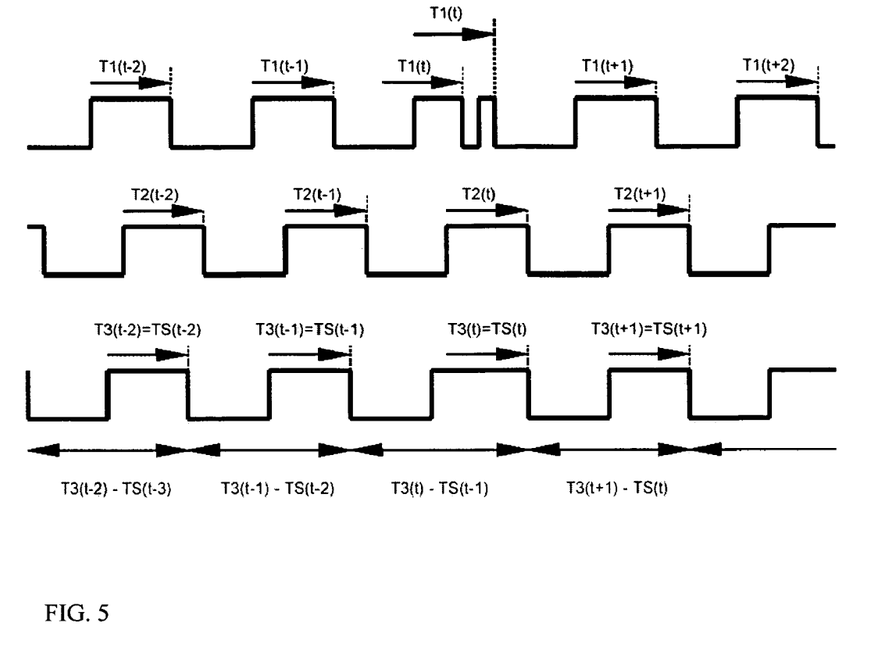
FIG. 5 shows signal graphs to show relationships between different crank sensor measurements.

During normal operation, when both sensor signals are valid, the register T3 consequently holds the average between the registers T1 and T2 (see FIG. 5). The phase delay referred to during step 1.a and 1.b above, does not denote the mechanical phase delay between the sensor signals (normally 12 degrees), but rather the type of phase delay that arises from mechanical in-accuracies, due to machining etc. The mechanical design specifications suggest that this phase delay never increases above 0.1 degrees. However, during some very rare failure conditions the phase delay between the two sensor signals can suddenly increase. Without the checks performed during step 1.a and step 1.b the FPGA algorithm does not cope with this failure scenario. Once the supervisory system has evaluated the rules above, the system employs the following set of rules in order to update TS and PT:

1. If T3 was not updated, i.e. some fault(s) was discovered, or if the supervisory system expects a missing tooth gap, the supervisory system expands the inspection window (i.e. setting LongT to: true). If an expanded inspection window is already in use, the supervisory system also updates the register TS according to: TS=TS+PT.

2. If T3 was indeed updated, and an extended inspection window is not in use (i.e. LongT is set to: false), the supervisory system performs the following:

a. PT is computed from: PT=((T3−TS)+PT1+PT2+PT3)/4.

b. The history registers PT1, PT2 and PT3 are updated by:

PT3=PT2, PT2=PT1 and PT1=(T3−TS).

c. TS is set according to: TS=T3.

3. If T3 was indeed updated, and an extended inspection window is in use (i.e. LongT is set to: true), the supervisory system performs the following:

a. PT is computed from: PT=((T3−TS)+PT1+PT2)/4. Note the difference from above.

b. The history registers PT1, PT2 and PT3 are updated by:

PT3=PT2, PT2=(T3−TS)/2 and PT1=(T3−TS)/2.

c. TS is set according to: TS=T3.

As can be seen from the update rules above, a moving average scheme is used for updating the FPGA algorithm's estimate of the tooth period, PT. The moving average scheme makes the FPGA algorithm robust against disturbances, but has the drawback that it also makes the FPGA algorithm less responsive to acceleration and deceleration.

In FIG. 5, the top two graphs shows Crank1 and Crank2 respectively and lowest graph shows the 'cleaned' measurement signal. Tooth t on Crank 1 is disturbed. In the case of no disturbances the falling edges of the cleaned measurement signal is aligned to the mid-point between the falling edges of the sensor signals. During disturbances this changes.

The supervisory system also ensures that the signal channels are activated and de-activated when needed. This is achieved by monitoring the PCL1/PCL2-register, and by setting the Slave1/Slave2-register appropriately. If a channel is activated and its PCL-register reaches zero the supervisory system sets the corresponding Slave1/Slave2 register to true. The Slave1/Slave2 register will thereafter remain true (indicating a de-activated state) until the corresponding PCL1/PCL2-register reaches 89. During normal operating mode, the flags Slave1 and Slave2 can never be true simultaneously. If this happens, the supervisory system changes its master mode to its synchronization mode.

D. Virtual Crank Sensor Output

Figure 6:
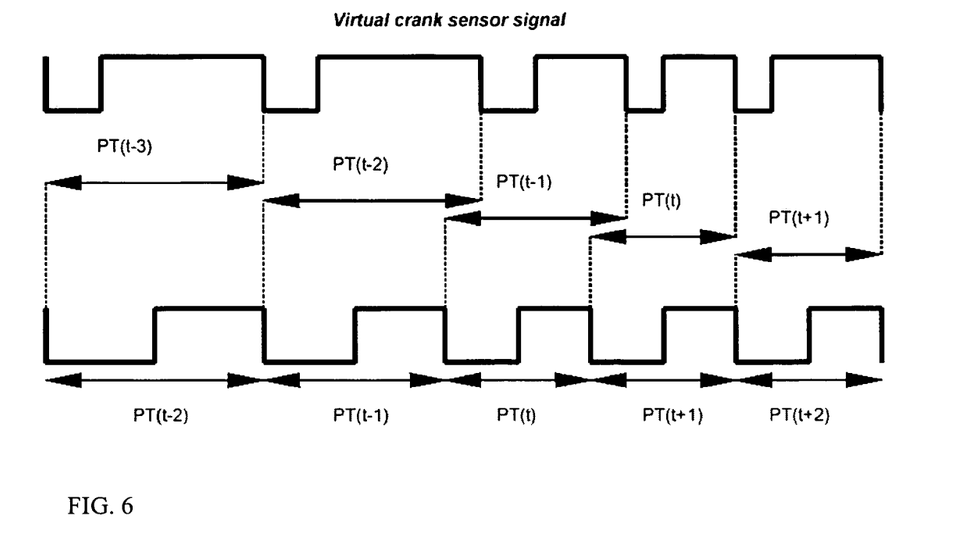
FIG. 6 shows signal graphs depicting a sample of a cleaned measurement signal and a virtual crank sensor signal.

The virtual crank sensor signal is formed from past values of PT and TS. As illustrated in FIG. 6, the falling edges of the virtual crank sensor signal is placed according to the formula:

$$Tv(t)=PT(t-1)+TS(t-1) \text{ or } Tv(t)=2\times PT(t-1)+TS(t-1)$$
when LongT is set).

Observe that the virtual crank sensor signal remains in its low state until the inspection window expires (normally this occur at 1.25×PT(t−1)+TS(t−1)). In order to generate a virtual crank sensor signal with the missing tooth gap correctly inserted (in the FPGA algorithm the missing tooth gap of the virtual sensor output coincides with the missing tooth gap of the first crank sensor), the FPGA algorithm need to maintain a tooth counter. The teeth are numbered 1-89, where tooth #1 corresponds to the first tooth following the missing tooth gap for the first crank sensor signal, and where tooth #89 corresponds to the tooth prior to the missing tooth gap for the first crank sensor signal. At a supervisory level in the algorithm, the FPGA algorithm continuously tries to detect if there is a phase difference between the virtual crank sensor signal and the measurements. Phase shifts are inadvertently introduced if the tooth counter is initialized on the wrong tooth—a phenomena that fortunately only can arise under very rare conditions. Despite the low probability that phase shifts are introduced, a procedure that detects phase shifts are extremely important as phase differences can cause serious damage to the engine.

E. Detecting Large Phase Shifts (More than 4 Degrees)

If a phase difference is inadvertently introduced, the FPGA algorithm can relatively quickly sense this by checking the status of its measurements during tooth #90 and tooth #3. In the normal case, when there is no phase difference, tooth #90 corresponds to the missing tooth gap for the first crank sensor signal while tooth #3 corresponds to the missing tooth gap for the second crank sensor signal. Consequently, if teeth are consistently emitted from the crank sensors during these phases, the FPGA algorithm should stop outputting the virtual crank sensor signal and re-synchronize against its measurements. This feature is implemented in the FPGA algorithm as a counter (denoted PIM) that increases its count by unity whenever a tooth is detected during the missing tooth gap (can be two each revolution). The counter decreases its count by unity if no tooth was detected during the missing tooth gap. When the counter value reaches 7 the FPGA algorithm stops outputting the virtual crank sensor signal and starts the re-synchronization process.

If a phase difference is present the FPGA algorithm, using the logic described above, will run for four revolutions until it starts its re-synchronization process (provided both sensors are active). If only ones sensor is active the FPGA algorithm will run for seven revolutions until it starts its re-synchronization process.

F. Behavior During the Synchronization Mode

Operation of the tooth-based sampling procedure employed by the FPGA algorithm is halted whenever the crank wheel stops spinning (that is, when the engine is stopped). To start operation of the FPGA algorithm, and to enable output of the virtual crank sensor signal, the FPGA algorithm needs to re-synchronize its tooth counter and sampling procedure. This involves finding a crank sensor signal that has a stable tooth frequency (to avoid being tricked into resynchronizing its output against a damaged sensor signal) and finding the missing tooth gap (to initialize the tooth counter).

For practical reasons the FPGA algorithm cannot search for a stable tooth frequency (a stable PT) on both sensor signals simultaneously. Instead, the FPGA algorithm alternates between the two sensor signals. The FPGA algorithm searches each sensor signal for 128 consecutive teeth/falling edges, or until a timer time-out event occurs (the timer times out after 87 ms, but is reset every time the FPGA algorithm detects a falling edge). During the 128 teeth the following steps will be carried out.

1. On each falling edge of the sensor signal, the time since the last falling edge is computed and stored in the variable PT.

2. The current PT is compared to the previous PT. If the change is less than 25% a counter is increased by one. If the change was more than 25% the counter value is reset to zero.

3. When the counter reaches 4 (that it after the FPGA algorithm has sensed four valid PTs in a row), the FPGA algorithm starts searching for a missing tooth gap.

4. While searching for the missing tooth gap the FPGA algorithm proceeds as above, meaning that PT is updated on each falling edge and compared to previous values. If the FPGA algorithm senses a change larger than 25% the counter is reset and the procedure is restarted.

5. When/if a missing tooth gap is detected, the tooth counter is set appropriately and the operational mode is changed to Normal.

These steps ensure that when the FPGA algorithm has re-synchronized the pulse train (generated by the crank sensor) has been undisturbed for at least four teeth (six if the missing gap is included). It should be noted that during synchronization, the FPGA algorithm does not filter its PT estimates through by a moving average filter, as done during normal operating mode. However, the history variables registers, PT1, PT2, and PT3 are updated simultaneously to PT. Thus, when the FPGA algorithm transits to the normal operating mode these variables have been properly initialized.

A reference implementation of an exemplary FPGA algorithm is attached hereto as ATTACHMENT A. Those skilled in the art will appreciate that provision of this specific algorithm is in no way is intended to limit the scope of the invention. In view of the teachings herein, control system engineers may be able to implement this or design an alternative algorithm to achieve similar aspects and features.

Those skilled in the art will recognize that, in addition to conventional 90-1 and 60-2 crank wheels, any number of rotating member apparatuses may implemented comprising a plurality of elements that generate a signal stream. Furthermore, though crank wheels comprising a missing element or elements are exemplified herein as the reference element, many different elements may be implemented such as, but not limited to, a wider element or different shaped element, or other such elements having different spatial characteristics. In addition to magnetic sensors, variable reluctance sensors and hall sensors, any number of other sensors that are capable of sensing the passage of elements of the rotating member may be implemented in accord with the teachings herein. Furthermore, the algorithm embodiments described herein can be readily adapted to generating a synthesized crank signal based on multiple time variant voltage signals (not necessarily a crankshaft speed sensor) that are fixed to the crankshaft rotation position, including but not limited to, alternators, or other electrical power generating equipment. Further, a phase locked loop can also be implemented as a means of estimating the location a downstream pulse in a pulse series in a synthesized signal.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The teachings of all references cited herein are incorporated in their entirety to the extent not inconsistent with the teachings herein.

What is claimed is:

1. A noise-resistant method of monitoring crankshaft position of an internal combustion engine, said method comprising
   providing a rotating member operationally coupled to said crankshaft, wherein said rotating member comprises a plurality of spaced elements and at least one reference element provided with a different spatial characteristic thereon;
   providing one or more crankshaft positioning sensors proximate to said rotating member so as to allow generation of at least one corresponding crank signal streams responsive to rotation of said rotating member;
   monitoring for crank signal generation during a predetermined inspection window, wherein, during undisturbed crank signal generation, a predefined number of crank signals occur in said predetermined inspection window;
   generating a virtual crank signal stream derived from crank signals of at least one crank signal stream,
   (i) said virtual crank signal stream persisting despite an addition of one or more false crank signals or deletion of one or more true crank signals that occur during said predefined inspection window;
   (ii) said virtual crank signal stream comprising a phase relative to said crankshaft that is monitored and maintained to correlate to a predicted location of said crankshaft despite noise on a crank signal stream;
   (iii) said virtual crank signal stream being monitored for integrity of the reference element of said virtual crank signal stream, wherein if the integrity of said reference element is violated, protection of said engine is initiated;
   whereby said virtual crank signal stream is useful to achieve noise-resistant monitoring of crankshaft position.

2. The method of claim 1, wherein said predicted location is computed by employing one or more upstream crank signal period measurements.

3. The method of claim 2, wherein
   (i) when two or more true crank signals are each observed in said predetermined inspection window and from separate crank signal streams, an average signal period is obtained by averaging periods of said two or more true crank signals so long as the phase delay between respective crank signal periods is less than a predefined value, said average signal period being accepted into said one or more upstream crank signal period measurements for computing a downstream predicted location; or
   (ii) when two or more true crank signals are each observed in said predetermined inspection window and from separate crank signal streams, the true crank signal period closest in value to an upstream crank signal period measurement, or average of upstream crank signal period measurements, is accepted into said one or more upstream crank signal period measurements for computing a downstream predicted location; or (iii) when only one true crank signal from said crank signal streams is observed in said predetermined window, the period of said only one true crank signal is accepted into said one or more upstream crank signal period measurements for computing a downstream predicted location.

4. The method of claim 2, wherein said predicted location is computed by averaging said one or more upstream crank signal period measurements.

5. The method of claim 1, wherein protection of engine comprises ceasing of virtual crank signal stream.

6. The method of claim 1, wherein protection of engine comprises shutting said engine down.

7. The method of claim 1, further comprising measuring time periods of two or more successive crank signals from said at least one corresponding crank signal streams to obtain a plurality of crank signal period measurements; and wherein generating a virtual crank signal stream comprises generating a series of virtual signals corresponding to said plurality of elements and said at least one reference element, wherein a virtual signal of said virtual crank signal stream comprises a virtual signal period that is computed based on a predetermined number of upstream crank signal period measurements.

8. The method of claim 1, wherein monitoring phase integrity of said virtual crank signal stream comprises monitoring for production of crank signals during a location on said virtual crank signal stream corresponding to said reference element.

9. The method of claim 6, wherein a violation of phase integrity comprises production of at least one crank signal during a location on said virtual crank signal stream corresponding to said reference element on one, two, three, four or more revolutions of said crankshaft.

10. The method of claim 1, wherein employment of signals from a sensor is discontinued if more than 3 consecutive inspection window failures occur within one revolution of said crankshaft for a given sensor.

11. The method of claim 10, wherein signals from a discontinued sensor are reconsidered upon generating a complete number of valid signals for a complete revolution of said crankshaft.

12. The method of claim 1, wherein a series of predetermined inspection windows are computed and wherein said virtual crank signal stream persists despite an addition of one or more false crank signals or deletion of one or more true crank signals that occur from all crank sensors in a predefined number of consecutive predetermined inspection windows.

13. The method of claim 12, wherein said predefined number of consecutive predetermined inspection windows is 3.

14. A method of producing a virtual crankshaft positioning signal stream for an internal combustion engine comprising a crankshaft, a rotating member operationally coupled thereto, said rotating member comprising a plurality of elements thereon with at least one reference element possessing a different spatial characteristic, and a first and second sensor that generate a first and second series of crank signals responsive to rotation of said rotating member, said method comprising:

measuring time periods of one or more successive crank signals from said first or second series of signals, or both, to obtain a plurality of crank signal period measurements; and generating a series of virtual crank signals corresponding to said plurality of elements and said at least one reference element, wherein a virtual signal of said series of virtual signals comprises a virtual signal period that is computed based on a predetermined number of upstream crank signal period measurements.

15. The method of claim 14, wherein generating a series of virtual crank signals comprises generating a first virtual crank signal comprising a signal period corresponding to an average of at least two crank signal period measurements, or within 75 to 125 percent of said average.

16. The method of claim 14, wherein said series of virtual crank signals comprise successive virtual crank signals having signal periods computed by employing a moving average of upstream crank signal period measurements.

17. The method of claim 14, wherein said rotating member comprises a plurality of teeth elements and at least one missing tooth element and said series of crank signals comprise a series of teeth signals comprising a rising edge and a falling edge and at least one missing tooth signal.

18. The method of claim 14, wherein measuring a time period comprises measuring time between successive falling edges.

19. The method of claim 14, wherein said rotating member is a crank wheel operationally coupled to said crankshaft, said crank wheel comprising a plurality of equidistantly spaced elements, and said first and second crank positioning sensors are offset twelve degrees apart.

20. The method of claim 14, wherein said rotating member is a crank wheel comprising 90 minus 1 teeth.

21. A method of monitoring crankshaft position of an internal combustion engine said engine comprising a crankshaft, a rotating member operationally coupled thereto comprising a plurality of elements with one or more reference elements possessing at least one different spatial characteristic, and one or more crank positioning sensors proximate to said rotating member so as to allow generation of one or more corresponding crank signal streams responsive to rotation of said rotating member; said method comprising monitoring for crank signal occurrence in a series of inspection windows in which, based on upstream crank signal period measurements, one or more crank signals are expected to be located;

accepting or rejecting a given crank signal depending on relationship between actual location and expected location of said given crank signal; and employing current or previously accepted crank signals, or both, to synthesize a virtual crankshaft positioning signal stream that correlates with crankshaft position;

wherein said virtual crankshaft positioning signal stream is useful for monitoring crankshaft position.

22. The method of claim 21, wherein when crank signals are rejected or when crank signals are not observed, or a combination thereof, for all crank positioning sensors for a predefined number of consecutive inspection windows, said engine is shut down.

23. The method of claim 22, wherein said predefined number is two or more.

24. The method of claim 23, wherein said predefined number is three.

25. The method of claim 21, wherein when crank signals are rejected or when crank signals are not observed, or a combination thereof, for a given crank positioning sensor for a predefined number of consecutive inspection windows, signal stream information from said given crank positioning sensor is ignored until satisfying predefined conditions.

26. The method of claim 21, wherein accepting or rejecting a given crank signal comprises rejecting said given crank signal if said given crank signal is not within 75 to 125 percent of an expected location for said given crank signal.

27. The method of claim 21, wherein said given crank signal comprises one or more rising or falling edges or no rising or falling edges and accepting or rejecting said given crank signal comprises rejecting said given crank signal if said given crank signal more than or less than an expected number of rising or falling edges expected to occur during the inspection window in which said given crank signal occurs.

28. A signal processor configured for producing a virtual crankshaft positioning signal stream useful for monitoring crankshaft position of an internal combustion engine, said engine comprising a crankshaft, a rotating member operationally coupled thereto comprising a plurality of elements with one or more reference elements possessing at least one different spatial characteristic, and one or more crank positioning sensors proximate to said rotating member so as to allow generation of one or more corresponding crank signal streams responsive to rotation of said rotating member; said signal processor comprising at least one processing module; at least one memory device operationally coupled to said at least one processing module; and program code modules stored in said signal processor:
- a computer readable first program code module for causing said signal processor to monitor for crank signal occurrence in a series of inspection windows in which, based on upstream crank signal period measurements, one or more crank signals are expected to be located;
- a computer readable second program code module for causing said signal processor to accept or reject a given crank signal depending on relationship between actual location and expected location of said given crank signal; and
- a computer readable first program code module for causing said signal processor to employ current or previously accepted crank signals, or both, to synthesize a virtual crankshaft positioning signal stream that correlates with crankshaft position;

wherein said virtual crankshaft positioning signal stream is useful for monitoring crankshaft position.

29. A computer program product for use with a locomotive engine comprising a signal processor configured for producing a virtual crankshaft positioning signal stream from one or more crank signal streams produced by one or more crank positioning sensors, respectively, in response to rotation of a crankshaft in said locomotive engine, said computer program product comprising a computer-usable medium which comprises computer readable program code modules embodied in said computer-usable medium:
- a computer readable first program code module for causing said signal processor to monitor for crank signal occurrence in a series of inspection windows in which, based on upstream crank signal period measurements, one or more crank signals are expected to be located;
- a computer readable second program code module for causing said signal processor to accept or reject a given crank signal depending on relationship between actual location and expected location of said given crank signal; and
- a computer readable first program code module for causing said signal processor to employ current or previously accepted crank signals, or both, to synthesize a virtual crankshaft positioning signal stream that correlates with crankshaft position;

wherein said virtual crankshaft positioning signal stream is useful for monitoring crankshaft position.

30. An engine control system for an internal combustion engine, wherein said engine comprises at least one cylinder, each cylinder retaining a piston, and wherein a crankshaft is operationally coupled to the pistons such that the crankshaft rotates twice per engine cycle and the position of each piston depends upon the rotational position of the crankshaft, said engine control system comprising:
(a) a signal processor, wherein said signal processor is configured to receive signals from one or more crank positioning sensors;
(b) a rotating member arranged to rotate responsive to rotation of said crankshaft, said rotating member comprises a plurality of spaced elements and at least one reference element provided with a different spatial characteristic thereon;
(c) one or more crank positioning sensors proximate to said rotating member so as to allow generation of one or more corresponding crank signal streams responsive to rotation of said rotating member;

wherein said signal processor comprising at least one processing module; at least one memory device operationally coupled to said at least one processing module; and program code modules stored in said signal processor:
- a computer readable first program code module for causing said signal processor to monitor for crank signal occurrence in a series of inspection windows in which, based on upstream crank signal period measurements, one or more crank signals are expected to be located;
- a computer readable second program code module for causing said signal processor to accept or reject a given crank signal depending on relationship between actual location and expected location of said given crank signal; and
- a computer readable first program code module for causing said signal processor to employ current or previously accepted crank signals, or both, to synthesize a virtual crankshaft positioning signal stream that correlates with crankshaft position;

wherein said virtual crankshaft positioning signal stream is useful for monitoring crankshaft position.

* * * * *